3,090,798
TETRAALKYLACETOACETIC THIOLESTERS
James C. Martin, Kingsport, Tenn., assignor to Eastman Kodak Company, Rochester, N.Y., a corporation of New Jersey
No Drawing. Filed Feb. 29, 1960, Ser. No. 11,496
6 Claims. (Cl. 260—455)

This invention concerns thiolesters and their method of preparation.

It is an object of this invention to provide a new class of thiolesters.

It is another object of this invention to prepare by a novel process thiolesters of 2,2,4,4-tetraalkylacetoacetic acids.

It is still another object of this invention to prepare a new class of thiolesters that have a utility as plasticizers for polyvinyl chloride and cellulosic esters.

These and other objects of the invention are accomplished by reacting 2,2,4,4-tetraalkyl-1,3-cyclobutanediones with a mercaptan and forming thiolesters of 2,2,4,4-tetraalkylacetoacetic acids. In the present process, a cyclic dione is converted into an aliphatic thiolester.

The 2,2,4,4-tetraalkyl-1,3-cyclobutanedione reactant in the present process has the following formula

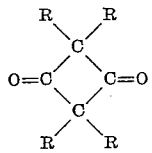

wherein R is an alkyl group having 1 to 4 carbon atoms. The alkyl radicals need not be the same on the 2,2,4,4-tetraalkyl-1,3-cyclobutanediones, such compounds as 2,4-dimethyl-2,4-diethyl-1,3-cyclobutanedione and the like being included in the invention. Other 2,2,4,4-tetraalkyl-1,3-cyclobutanediones that can be suitably employed in the invention include such 2,2,4,4-tetraalkyldiones as the 2,2,4,4-tetramethyl dione, the 2,2,4,4-tetraethyl dione, the 2,4-dipropyl-2,4-diethyl dione, the 2,4-dimethyl-2,4-dipropyl dione, the 2,4-diethyl-2,4-dibutyl dione, etc.

In the present process a mercaptan is reacted with the 2,2,4,4-tetraalkyl-1,3-cyclobutanedione. As used herein, the term "mercaptan" refers to any hydrosulfide or compound containing the radical, —SH. A wide variety of mercaptans can be utilized in the present process including aliphatic mercaptans, aromatic mercaptans, difunctional mercaptans and others. Particularly effective mercaptans are those mercaptans represented by the formulas R'—SH and HS—R''—SH wherein the R' is an alkyl radical having 1 to 16 carbon atoms or a phenyl radical including substituted phenyl radicals, and R'' is an alkylene radical having 2 to 16 carbon atoms. Typical mercaptans that can be suitably employed in the invention include ethanethiol, methanethiol, 1,2-ethanedithiol, 1,4-butanedithiol, 1,6-hexanedithiol, tert-butylmercaptan, tert-octylmercaptan, tert-dodecylmercaptan, tert-tetradecylmercaptan, thiophenol, p-tert-butyl-thiophenol, p-thiocresol, ethylmercaptoacetate, 2-mercaptoethanol, 1-hexadecanethiol, 1,2-hexadecanedithol and related mercaptans.

The reaction of 2,2,4,4-tetraalkyl-1,3-cyclobutanediones to form the thiolesters of 2,2,4,4-tetraalkylacetoacetic acids of the invention can be carried out in the absence of a catalyst. However, a basic catalyst is generally utilized. A wide variety of basic catalysts can be employed, the concentration of the catalyst used depending mainly on the basic strength of the catalytic agent. When the catalyst used is a basic substance which has an ionization constant greater than about $1 \times 10^{-2}$, such as sodium alkoxide and trimethylphenyl ammonium hydroxide, the amount of catalyst generally does not exceed about 5% by weight based on the 2,2,4,4-tetraalkyl-1,3-cyclobutanediones, and preferably is about .005% to 5%. When the catalyst is a basic substance which has an ionization constant less than $1 \times 10^{-2}$, such as the weak organic basis, of which pyridine is an example, larger amounts of catalyst of generally about 5% to 50% based on the weight of the 2,2,4,4-tetraalkyl-1,3-cyclobutanediones are utilized. Any basic material which does not itself react with the reactants will catalyze the reaction. Typical basic catalysts include quarternary ammonium hydroxides; alkali and alkaline earth, metal alkoxides, oxides, hydroxides, and carbonates; tertiary amines such as pyridine and triethyl amine; secondary amines such as piperidines; and the like.

A wide range of reaction temperatures can be utilized in the present process, although temperatures in the range of about $-45°$ C. to $250°$ C. are generally utilized, with temperatures in the range of about $0°$ C. to $200°$ C. being preferred. Temperatures higher than those necessary to complete the reaction in a reasonable time are generally not utilized in accordance with usual chemical practice. Typical reaction times vary between about 1 hour to 15 hours depending upon the reaction temperature, the particular reactants, the catalyst and related reaction variables. However, longer or shorter reaction periods can be utilized.

The present process can be carried out in the absence of a solvent, although inert reactant solvents are conventionally utilized. Solvents that can be suitably employed are those in which the reactants have some solubility and are inert to the reactants. Typical solvents include ethers, esters, aliphatic and aromatic hydrocarbons, chlorinated hydrocarbons and the like as illustrated by such well-known solvents as xylene, toluene, dimethylformamide and others.

The reaction of 2,2,4,4-tetraalkyl-1,3-cyclobutanediones with a mercaptan produces thiolesters of 2,2,4,4-tetraalkylacetoacetic acids in high yields. Excess or unreacted reactants can be readily separated from the desired thiolester reaction product by conventional purification or "working up" techniques including fractional distillation, fractional crystallization, solvent extraction and related methods or techniques.

When the mercaptan reactant is a monofunctional compound such as illustrated by the formula, R'—SH, it reacts with one molar proportion of a 2,2,4,4-tetraalkyl-1,3-cyclobutanedione to form a thiolester of 2,2,4,4-tetraalkylacetoacetic acid having the following structure:

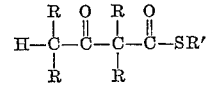

When the mercaptan reactant is a difunctional compound as illustrated by the formula, HS—R'$_2$—SH, it reacts with two molar proportions of a 2,2,4,4-tetraalkyl-1,3-cyclobutanedione to form a thiolester of 2,2,4,4-tetraalkylacetoacetic acid having the following structure:

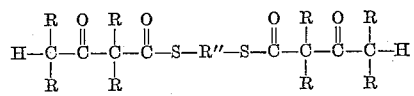

The proportions of the reactants can be varied in accordance with usual practice although approximately stoichiometric amounts of the reactants are more generally utilized. Stoichiometric excesses are not detrimental to the reaction and can be separated from the reaction product by conventional separating and "working up" techniques as described above.

The thiolesters of 2,2,4,4-tetraalkylacetoacetic acids are new compounds in the thiolester art and have broad utility, including utility as oil additives, intermediates in the synthesis of dyes and pharmaceutical compounds, as plasticizers and related uses. The subject thiolesters of 2,2,4,4-tetraalkylacetoacetic acids have particular utility as plasticizers for solid resinous polyvinyl chloride and cellulosic esters. Such plasticizers are generally used in polyvinyl chlorides at concentrations of about 10% to 50% and in cellulosic esters at concentrations of about 10% to 40% based on the weight of the resin. Cellulosic esters that can be plasticized include normally solid cellulose esters of fatty acids having 2 to 4 carbon atoms such as cellulose triacetate, cellulose acetate butyrate and the like. In addition, the subject thiolesters can be used as rubber plasticizers.

With respect to the nomenclature used herein, the term "2,2,4,4-tetraalkyl-1,3-cyclobutanedione is equivalent to the terms "2,2,4,4-tetraalkylcyclobutane-1,3-dione," "tetraalkyl-1,3-cyclobutanedione" and "2,2,4,4-tetramethylcyclobutanedione-1,3."

The invention is illustrated by the following examples of preferred embodiments thereof:

*Example 1*

A mixture of 101 g. of 1-dodecanethiol, 70 g. of 2,2,4,4-tetramethyl-1,3-cyclobutanedione, 0.5 g. of sodium and 300 ml. of xylene was refluxed with stirring for 3 hours. The reaction solution was stripped of low boilers up to a pot temperature of 215° C. at 3 mm. of mercury. The residue was distilled in a cyclic falling film molecular still at 78–88° C. at 20 microns of mercury to give 155 g. of 2,2,4-trimethyl-3-oxothiovaleric acid, dodecyl ester, $n_D^{20}$ 1.4705.

*Analysis.*—Calcd. for $C_{18}H_{26}O_2S$: C, 70.2; H, 11.1; S, 9.4; mol. wt., 342. Found: C, 70.2; H, 11.4; S, 9.4; mol. wt. (B.P. elevation in benzene), 340.

*Example 2*

A mixture of 50 g. of p-tert-butylthiophenol, 42 g. of 2,2,4,4-tetramethyl-1,3-cyclobutanedione, 0.5 g. of sodium and 200 ml. of toluene was refluxed with stirring for 4 hours. The resulting reaction mixture was cooled and then washed with sodium hydroxide solution. The resulting mixture was separated, washed with water and dried over anhydrous magnesium sulfate. After drying, the solvent was evaporated on a steam bath. The crude 2,2,4-trimethyl-3-oxothiolvaleric acid, p-(tert-butylphenyl) ester solidified readily and weighed 55.3 g. An analytical sample was recrystallized from aqueous ethanol, and then from hexane to give a product melting at 58–59° C.

*Analysis.*—Calcd. for $C_{18}H_{26}O_2S$: C, 70.6; H, 8.5; S, 10.5. Found: C, 70.7; H, 8.5; S, 10.5.

*Example 3*

A mixture of 30 g. of 1,6-hexanedithiol, 56 g. of 2,2,4,4-tetramethyl-1,3-cyclobutanedione, 1 g. of sodium methoxide and 200 ml. of xylene was refluxed for 2 hours. The solution was cooled to 0° C. and washed with cold sodium hydroxide solution, then with water and finally dried over anhydrous magnesium sulfate. The dried solution was evaporated on the steam bath to yield 76.2 g. of crude 1,6-hexanedithiol, bis(2,2,4-trimethyl-3-oxothiolvalerate). This material was distilled in an alembic type pot molecular still at one micron of mercury, B.P. 108–133° C., $n_D^{20}$=1.4929–1.4961.

*Analysis.*—Calcd. for $C_{22}H_{38}O_4S_2$: C, 61.4; H, 8.8; S, 14.9. Found: C, 61.4; H, 9.0; S, 14.6.

*Example 4*

A solution of 42 g. of 2,4-diethyl-2,4-dimethyl-1,3-cyclobutanedione and 0.3 g. of sodium methoxide in 100 ml. of 1-ethanethiol was refluxed with stirring for 8 hours. The reaction solution was distilled rapidly to remove low boilers and the residue was fractionated through an 18 inch packed column to give 49 g. of 2-ethyl-2,4-dimethyl-3-oxothiolhexanoic acid, ethyl ester, B.P. 108–111° C. under 10 mm. of mercury.

*Analysis.*—Calcd. for $C_{12}H_{22}O_2S$: C, 62.6; H, 9.6; S, 13.9. Found: C, 62.4; H, 9.6; S, 13.6.

*Example 5*

A mixture of 71 g. of 2,2,4-tetramethyl-1,3-cyclobutanedione, 101 g. of 1-tert.-dodecanethiol and 1 g. of sodium was heated during 1 hour to 150° C. The reaction mixture was cooled, slowly poured into water, separated from the water and dried. The 168 g. of the resulting crude product was distilled through a spinning band column to give 110 g. of 2,2,4-trimethyl-3-oxothiolvaleric acid, tert-dodecyl ester, B.P. 127° C. under .48 mm. of mercury, $n_D^{20}$=1.4749.

*Analysis.*—Calcd. for $C_{20}H_{38}O_2S$: C, 70.2; H, 11.1; S, 9.4. Found: C, 70.9; H, 11.3; S, 9.4.

*Example 6*

A mixture of 70 g. of 2,2,4,4-tetramethyl-1,3-cyclobutanedione, 78 g. of 2-mercaptoethanol and 2 g. of 1,4-diazabicyclo[2.2.2]octane(triethylenediamine) was heated at 140° C. for 3 hours. The reaction product was cooled, and added to 500 ml. of water. Extraction of the resulting mixture with ether gave 100.5 g. of crude 2,2,4-trimethyl-3-oxothiolvaleric acid, 2-hydroxyethyl ester which was further purified by vacuum distillation.

*Analysis.*—Calcd. for $C_{10}H_{18}O_3S$: C, 55.0; H, 8.3; S, 14.7. Found: C, 55.1; H, 8.3; S, 14.5.

*Example 7*

The thiolester prepared as described in Example 1 was employed to plastize polyvinyl chloride and cellulose acetate butyrate. The plasticizer was substantially uniformly mixed with the polyvinyl chloride and cellulose acetate butyrate on heated rollers and formed into sheets. The sheets of polyvinyl chloride and cellulose acetate butyrate showed high impact strength and good flexibility. The cellulose acetate butyrate was a solid resin having an acetyl content of about 13% and a butyryl content of about 35%. The concentration of plasticizer in the cellulose acetate butyrate was about 25% by weight based on the cellulose acetate butyrate, and in the polyvinyl chloride about 40% by weight based on the polyvinyl chloride. Similarly the thiolesters described in Examples 2–6 can be utilized to plastize polyvinyl chloride and cellulose acetate butyrate.

The present invention thus provides a convenient method for preparing thiolesters of 2,2,4,4-tetraalkylacetoacetic acids, which compounds are new in the thiolester art and have considerable utility, particularly as plasticizers for such resins as polyvinyl chloride and cellulose acetate butyrate.

Although the invention has been described in considerable detail with reference to certain preferred embodiments thereof, it will be understood that variations and modifications can be effected within the spirit and scope of the invention as described hereinabove and as defined in the appended claims.

I claim:

1. A thiolester of a 2,2,4,4-tetraalkylacetoacetic acid having a formula selected from the group consisting of

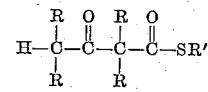

and

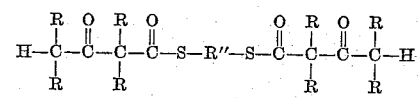

where R is an alkyl radical having 1 to 4 carbon atoms, R' is hydrocarbon selected from the group consisting of alkyl radicals having 1 to 16 carbon atoms and phenyl radicals, and R" is an alkylene radical having 2 to 16 carbon atoms.

2. 2,2,4-trimethyl-3-oxothiolvaleric acid, dodecyl ester.

3. 2,2,4-trimethyl-3-oxothiolvaleric acid, p-(tert-butylphenyl) ester.

4. 1,6 - hexanedithiol, bis(2,2,4 -trimethyl - 3 - oxothiolvalerate).

5. 2 - ethyl - 2,4 - dimethyl - 3 - oxothiolhexanoic acid, ethyl ester.

6. 2,2,4 -trimethyl - 3 -oxothiolvaleric acid, tert-dodecyl ester.

References Cited in the file of this patent
UNITED STATES PATENTS 2,351,366    Pohl et al. _____ June 13, 1944

OTHER REFERENCES

Royals: "Advanced Organic Chemistry," pages 589–590 (1954).